March 28, 1939.  W. B. PAINE  2,152,084
BRAKE
Filed June 5, 1936  4 Sheets-Sheet 2

INVENTOR.
WILLARD B. PAINE
BY Jerome R. Cox
ATTORNEY.

March 28, 1939. W. B. PAINE 2,152,084
BRAKE
Filed June 5, 1936 4 Sheets-Sheet 3

INVENTOR
WILLARD B. PAINE
BY Jerome R. Cox
ATTORNEY.

March 28, 1939. W. B. PAINE 2,152,084
BRAKE
Filed June 5, 1936 4 Sheets-Sheet 4
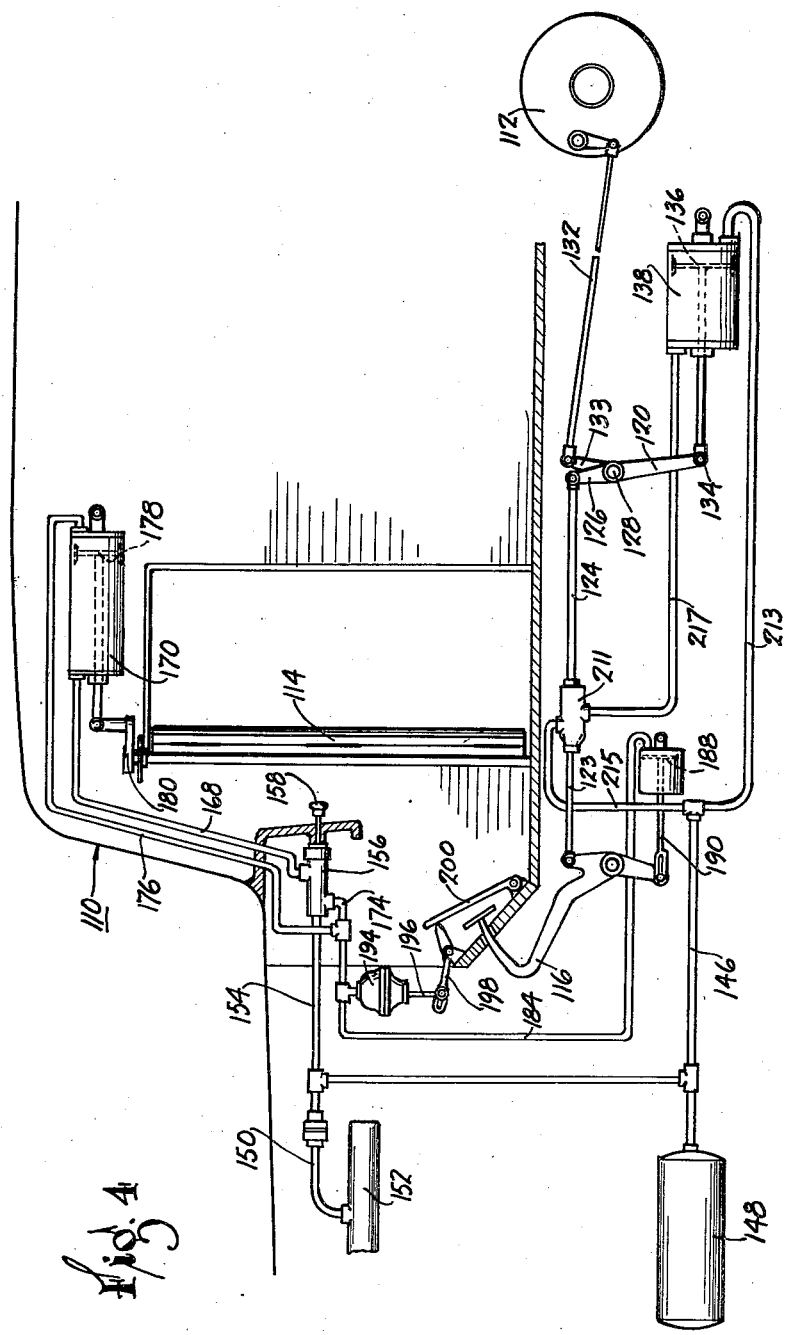
INVENTOR
WILLARD B. PAINE
BY Jerome R Cox
ATTORNEY.

Patented Mar. 28, 1939

2,152,084

UNITED STATES PATENT OFFICE 2,152,084

BRAKE

Willard B. Paine, South Bend, Ind., assignor to Bendix Products Corporation, South Bend, Ind., a corporation of Indiana Application June 5, 1936, Serial No. 83,734

3 Claims. (Cl. 303—6.1)

This invention relates to automotive vehicles and is especially directed to the operation of brakes and doors therefor and to interlocking means between the door operating means and the brake operating means.

One of the objects of the invention is to make such vehicles more safe by preventing the opening of the doors except when the brakes are fully applied and by insuring that the brakes are fully applied whenever the door is opened.

A further object of the invention is the provision of an interlock device so arranged that when the door is opened, the actuation of the door operating means also actuates means for applying the brakes.

A further object of the invention is the provision in combination with the above features of a stop for preventing the operation of the throttle control when the door is opened.

A feature of the invention is the arrangement of valves and conduits so that while the power braking system is effective and the brakes may be applied at all times as though there were no interconnected door operating device, yet operation of the door opening device also automatically applies the brakes.

Further objects and features of the invention will be apparent after a reading of the subjoined specification and claims and after a consideration of the accompanying drawings, in which:

Figure 4 is a diagrammatic view similar to Figure 1 but showing the use of my invention as applied to a power brake system in which there is an external valve for controlling the brake.

Figure 1:
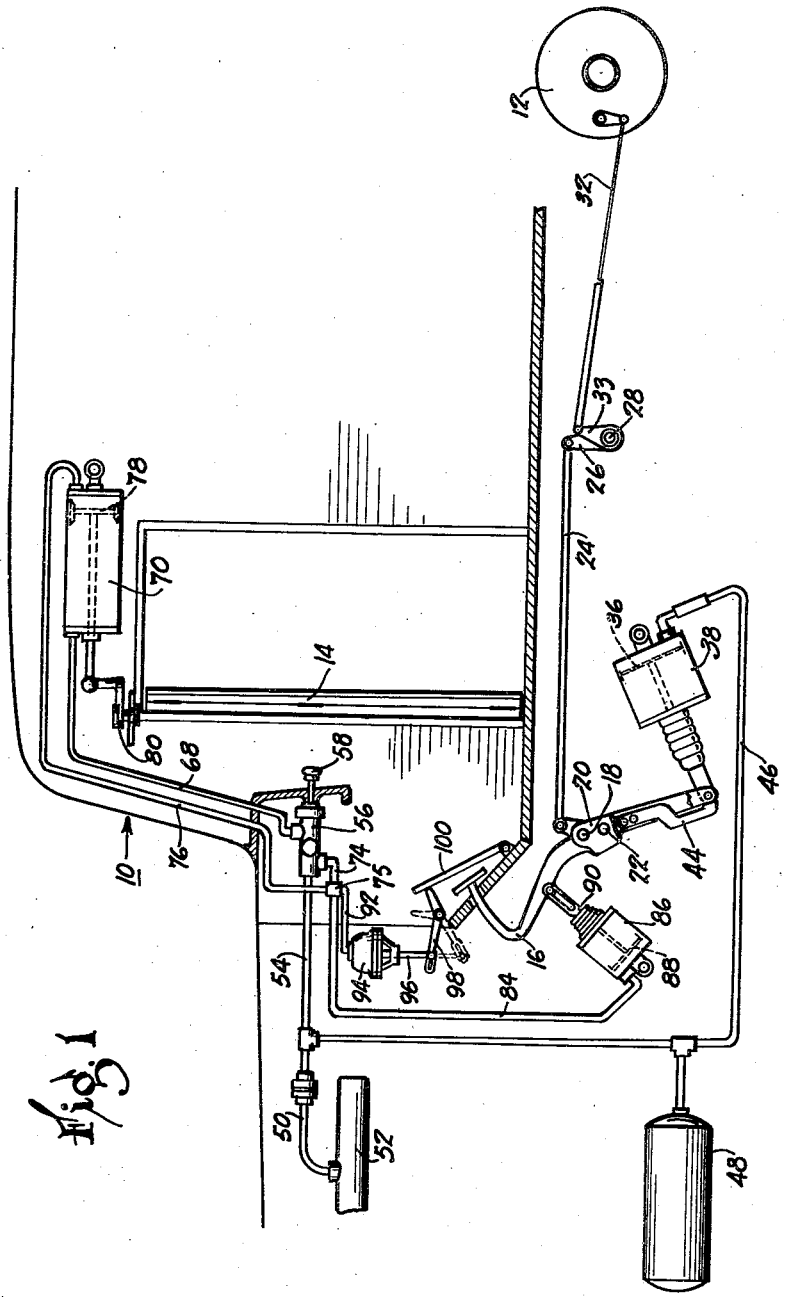
Figure 1 is a diagrammatic view of a brake and door opening system arranged according to my invention.
Figure 3:
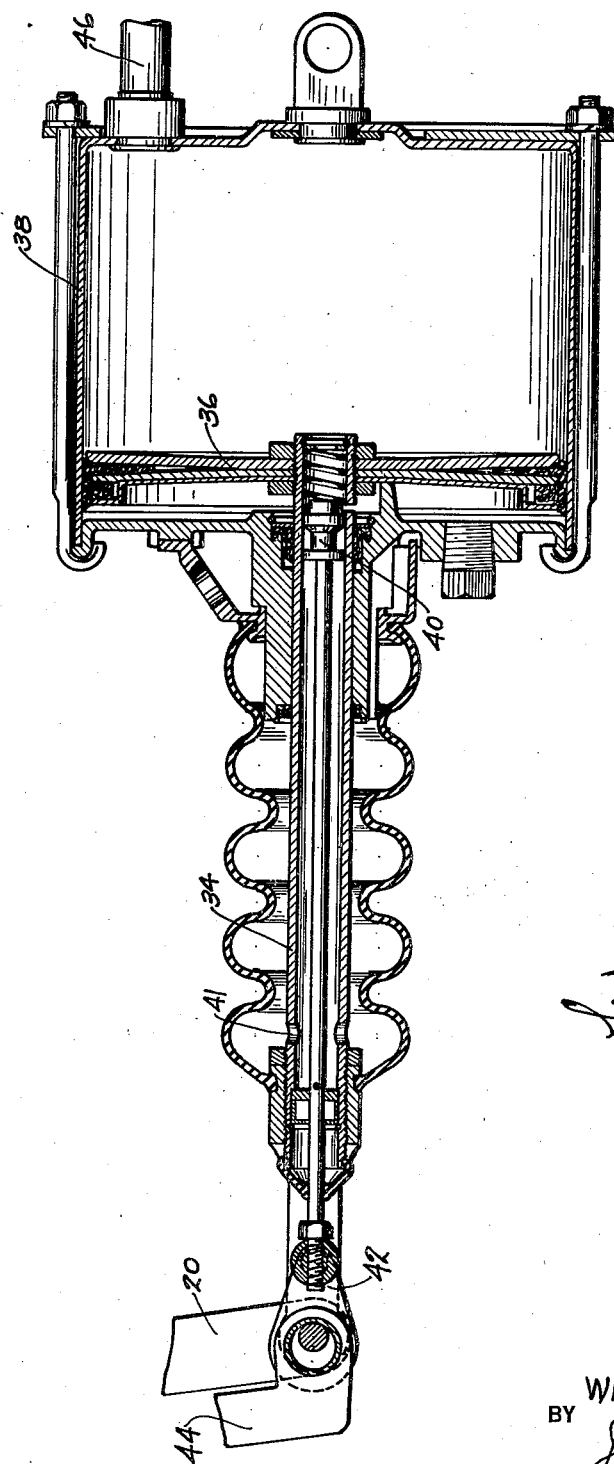
Figure 3 is a sectional view on an enlarged scale of the power cylinder of Figure 1.

Referring in detail to the drawings in which like numerals have been used to indicate similar parts, there is shown in Figure 1 an automobile bus 10 provided with brakes 12 and a door 14. A brake pedal 16 is provided for the usual operation of the brakes 12 and is pivotally mounted as at 22 on the chassis of the bus. A brake power lever 20 is pivotally mounted on the pedal 16 as at 18. The upper end of the power lever 20 is connected through a link 24 with an arm 26 secured to the cross shaft 28. The cross shaft 28 has another arm 33 which is connected through linkage 32 with the brakes 12. The lower end of the power lever 20 is connected to a hollow piston rod or sleeve 34 (shown in Figure 3) which is secured to the piston 36 of the fluid pressure motor 38. Within the sleeve 34 is a valve member 40 which is connected as at 42 with the valve lever extension 44 secured to the lower end of the pedal lever 16. Thus operation of the pedal lever may actuate the valve 40 to allow air to enter through the ports 41 into the cylinder 38 to the left of the piston (as shown in Figure 3). The rear end of the cylinder 38 is connected by a conduit 46 with a reserve tank 48 and also with the intake manifold 52 of the motor of the vehicle. Inasmuch as this connection maintains the rear of the cylinder 38 always at subatmospheric pressure, inflow of air through the valve 40 exerts force to move the piston 36 rearwardly drawing with it the sleeve 34 and the power lever 20, thus operating the brakes. In the event of failure of power, the power lever 20 reaches the limit of its loose fit around the shaft 22 and then pedal lever 16 operates the power lever through its pivotal connection 18 with said power lever to apply the brakes manually.

Figure 2:
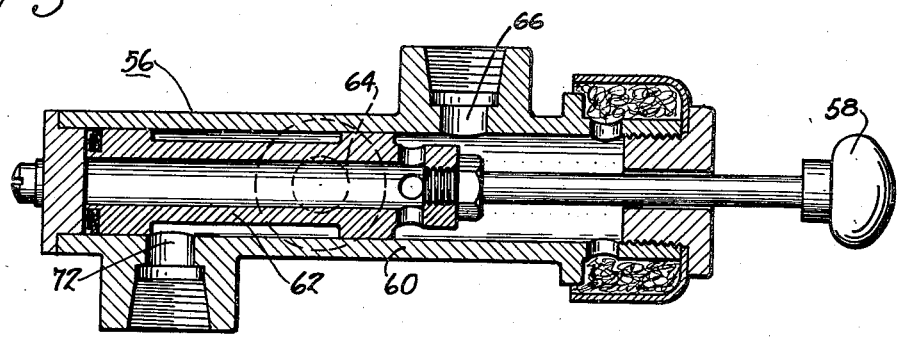
Figure 2 is a sectional view on an enlarged scale of the valve used for controlling the door opening and the simultaneous brake operation.

Somewhat similar means are provided for opening the door 14. The manifold 52 is connected through the conduit 50 and the conduit 54 with a door valve 56 (shown more clearly in Figure 2). The door valve is provided with a handle 58 for operating it and as shown in Figure 2 includes a casing 60 and an internal valve member 62. The conduit 54 is connected to the casing 60 as at 64 and the casing is also provided with an opening 66 connected through a conduit 68 with the front of the door motor 70. It is also provided with an opening 72 connected through conduit 74, cross fitting 75 and conduit 76 with the rear of the door motor 70. It may be seen that with the valve member 62 in the position shown in Figure 2, the intake manifold is connected through the opening 64 and the interior of the casing, through the opening 72, and the conduits 74 and 76 with the rear of the motor 70, thus holding the piston 78 thereof in its rearward position to hold the door open. If the handle 58 is pulled rearwardly the valve member 62 moves rearwardly, thus connecting the opening 66 with the intake manifold and connecting the opening 72 with the atmosphere. Thereby the door motor is actuated so that pressure on the piston 78 moves the piston of the motor 70 forward and by reason of the connection 80 closes the door. When the knob 58 is moved forward again, the opening 66 is connected to the atmosphere and the opening 72 is again connected to the intake manifold, thus reversing the pressures and moving the piston rearwardly to open the door.

At the same time that the door is opened the valve 56 operates also to apply the brakes. The cross 75 is also connected to a conduit 84 which is in turn connected to the forward end of a small power cylinder 86. The power cylinder 86 is provided with a piston 88 which has a piston rod 90 pivotally connected to the brake pedal 16. Thus when the valve 56 is operated to open the door 14 it also, by means of the power cylinder 86, operates the pedal 16 by power and through the power cylinder 38 applies the brakes. The rod 90 is connected to the piston 88 by a slip joint so that the pedal may be manually operated without moving the piston.

Means are also provided for preventing accidental operation of the accelerator pedal when the door is opened. This means comprises a conduit 92 connected to the cross fitting 75 and to a small power cylinder 94, the piston of which is connected through a rod 96 with a stop lever 98 so arranged that on actuation of the motor 94 the lever 98 will be moved to the position shown in which it prevents actuation of the accelerator pedal 100.

In the arrangement shown in Figure 4, like numbers with the addition of 100 are used to designate similar parts. However, the auxiliary power cylinder 188 (used for operating the pedal 116 whenever the door 114 is opened) is arranged as a pull type operator connected to the pedal below the pivot. Moreover, the valve 211 is an external valve and is interposed between the links 123 and 124 connecting the pedal 116 with the arm 126. Moreover, the piston rod 134 of the power cylinder 138 is connected to a lever 120 which is secured directly to the cross shaft 128. The rear end of the cylinder 138 is connected at all times with the conduit 146 by a branch conduit 213 and the front end of the cylinder 138 is connected to the conduit 146 by conduits 215 and 217 between which there is interposed the valve 211.

Figure 5:
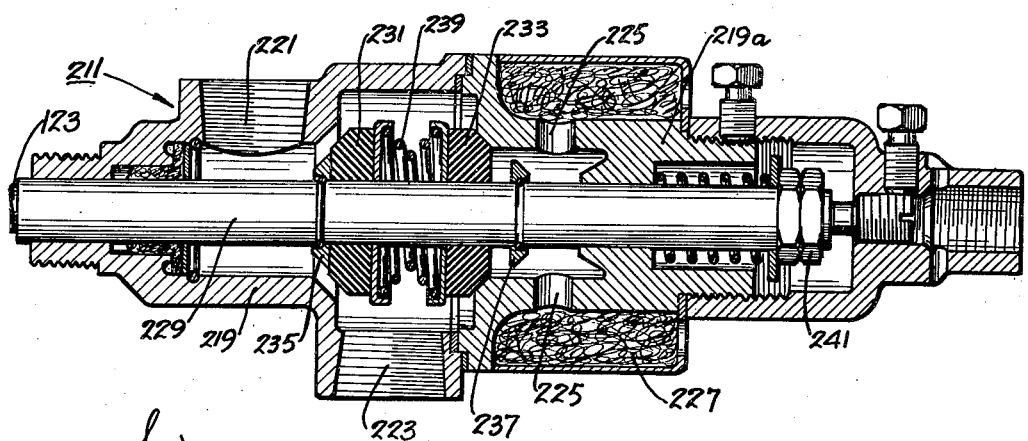
Figure 5 is a view in section on an enlarged scale of the external valve shown in Figure 3.

The valve 211 is shown more clearly in Figure 5 and includes a casing 219 provided with a port 221 connected to the conduit 215, a port 223 connected to the conduit 217, and inlet ports 225 leading through an air cleaner 227 to the atmosphere. Within the casing is a valve device comprising a rod 229 to the forward end of which is secured the link 123 and on which there are slidably mounted a pair of poppet valves 231 and 233 and arranged to be actuated by collars 235 and 237 secured to the rod. Between the poppet valves there is interposed a spring 239 which is arranged to spread the valves. When the rod 229 is in its rearward position as shown, the poppet valve 233 is seated so as to prevent air from entering through the air cleaner into the conduit 217. At the same time the valve 231 is removed from its seat so that air may be withdrawn from the front end of the cylinder 138 through the conduit 217, the opening 223, the opening 221 and the conduit 215. Forward movement of the rod 229 first allows the valve 231 to seat, thus cutting off the connection between the conduit 215 and 217 and then moves the valve 233 from its seat allowing air to enter through the air cleaner through the port 223 and the conduit 217 to the front end of the cylinder 138. The entrance of air at the front of the cylinder 138 actuates the piston 136 to move the piston rearward to apply power to the power lever 120 and thus apply the brakes. In the event of failure of the power fluid, contact of the nuts 241 with the rear section 219a of the casing 219 applies force to the casing and the casing through its connection with the link 124 applies the brakes directly by manual application.

In the operation of both forms of my invention shown, the brakes may be applied as described in the ordinary way by the pedal 16 (116) either manually or by the power cylinder 38 (138). In the event that it is desired to open the door, operation of the door opening valve 56 (156) accomplishes this function through the door operating cylinder 70 (170). At the same time the valve 56 (156) connects the intake manifold with the auxiliary cylinder 88 (188) which actuates the brake pedal in the same way that the foot of the operator would and thus applies the brakes. Also the valve connects the auxiliary cylinder 94 (194) with the source of suction, thus preventing accidental operation of the accelerator pedal.

It is to be understood that the above-described embodiments of my invention are for the purpose of illustration only and various changes may be made therein without departing from the spirit and scope of the invention.

I claim:

1. For use with an automotive vehicle, a combined system comprising means including a pedal for operating brakes, means including a power cylinder and a source of fluid pressure differential for opening a door, and means including a power cylinder responsive to the operation of the door operating means for actuating the brake applying pedal, there being provided a control valve having a connection with said source of fluid pressure differential, having another connection with one end of said power cylinder for operating said door, and having another connection jointly with the other end of said door operating cylinder and with said power cylinder connected with said brake pedal.

2. For use with an automotive vehicle, a combined system comprising means including a main power cylinder, a source of suction and a pedal for operating brakes, means including a door operating power cylinder for opening a door, and means including an auxiliary power cylinder responsive to the operation of the door operating means for actuating the brake applying pedal, there being provided a control valve having a connection with said source of fluid pressure differential, having another connection with one end of said door operating power cylinder and having another connection jointly with the other end of said door and with said auxiliary power cylinder.

3. For use with an automotive vehicle, a combined system comprising brakes, a door, means including a pedal, a main power cylinder, a source of suction, a valve connected to said pedal and controlling a connection between said source and said power cylinder for operating said brakes, means including a door operating power cylinder for opening said door, and means including an auxiliary power cylinder responsive to the operation of the door operating means for actuating the brake applying pedal, there being provided a control valve having a connection with said source of fluid pressure differential, having another connection with one end of said door operating power cylinder and having another connection jointly with the other end of said door and with said auxiliary power cylinder.

WILLARD B. PAINE.